(12) United States Patent
Degler

(10) Patent No.: US 9,133,936 B2
(45) Date of Patent: Sep. 15, 2015

(54) SEAL RETAINER DEVICE AND POWER TRANSMISSION UNIT WITH SEAL RETAINER DEVICE

(75) Inventor: Mario Degler, Baden-Baden (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 2005 days.

(21) Appl. No.: 11/986,513

(22) Filed: Nov. 21, 2007

(65) Prior Publication Data

US 2008/0156129 A1 Jul. 3, 2008

(30) Foreign Application Priority Data

Dec. 27, 2006 (DE) .......................... 10 2006 061 551

(51) Int. Cl.
*F16H 45/02* (2006.01)
*F16J 15/16* (2006.01)
*F16J 15/06* (2006.01)

(52) U.S. Cl.
CPC ............... *F16J 15/062* (2013.01); *F16H 45/02* (2013.01); *F16H 2045/021* (2013.01); *F16H 2045/0247* (2013.01); *F16H 2045/0284* (2013.01); *Y10T 74/19633* (2015.01)

(58) Field of Classification Search
CPC .... F16J 15/062; F16J 15/16; F16H 2045/021; F16H 2045/0247; F16H 2045/0284
USPC ....................... 192/3.3, 85.44, 85.54
See application file for complete search history.

(56) References Cited

U.S. PATENT DOCUMENTS

| | | | | |
|---|---|---|---|---|
| 4,289,048 A | * | 9/1981 | Mikel et al. | 477/64 |
| 4,289,220 A | * | 9/1981 | Onuma et al. | 192/3.3 |
| 4,301,900 A | * | 11/1981 | Sunohara et al. | 192/3.3 |
| 4,406,355 A | * | 9/1983 | Bionaz | 192/3.3 |
| 4,924,978 A | * | 5/1990 | Ohkubo | 192/3.3 |
| 5,400,886 A | * | 3/1995 | Kopacin | 192/85.51 |
| 5,575,363 A | * | 11/1996 | Dehrmann et al. | 192/3.3 |
| 5,964,328 A | * | 10/1999 | Fallu et al. | 192/3.29 |
| 6,155,392 A | * | 12/2000 | Kundermann | 192/3.3 |
| 6,431,335 B1 | * | 8/2002 | Kundermann | 192/3.3 |
| 6,533,088 B2 | * | 3/2003 | Hinkel | 192/3.29 |
| 2005/0155831 A1 | * | 7/2005 | Masuya | 192/3.3 |
| 2005/0211523 A1 | * | 9/2005 | Takahashi | 192/3.29 |

* cited by examiner

*Primary Examiner* — Terry Chau
(74) *Attorney, Agent, or Firm* — Simpson & Simpson, PLLC

(57) ABSTRACT

A seal retainer device for fixing the position of at least one sealing device, comprising at least one contact surface for fixing the position of a seal in the radial and/or axial direction, a first functional surface for linking to a component, and at least one second functional surface to form an axial or radial bearing sliding surface. In addition, the invention relates to a power transmission unit having a seal retainer that holds seals for sealing off two pressure chambers.

18 Claims, 2 Drawing Sheets

SEAL RETAINER DEVICE AND POWER TRANSMISSION UNIT WITH SEAL RETAINER DEVICE

CROSS REFERENCE TO RELATED APPLICATIONS

This patent claims priority of German Patent Application No. 10 2006 061 551.4, filed Dec. 27, 2006, which application is incorporated herein by reference.

FIELD OF THE INVENTION

The invention relates generally to a seal retainer device, and, more particularly, to a seal retainer device and power transmission unit with a seal retainer device.

BACKGROUND OF THE INVENTION

In power transmission units for transferring power between a drive engine and a transmission, comprising a hydrodynamic component and an engageable and disengageable clutch device which serves to bypass the transferring of power via the hydrodynamic component, normally different pressure chambers are provided. Two pressure chambers with corresponding connections are provided in the hydrodynamic component only for conveying process fluids, whereby it is also being to control the conveying of process fluids possible via the connections. A first pressure chamber is formed here by the working chamber of the hydrodynamic component, while the second pressure chamber is formed by the interspace between the housing and the hydrodynamic component. If a separate pressure chamber is provided in addition for pressurizing the actuating mechanism, in particular the piston element of the engageable and disengageable clutch device, the latter is also actuatable via a corresponding connection. Here it is necessary to seal the pressure chambers appropriately from each other, with the demand on the sealing devices being kept as small as possible. The individual sealing devices are normally fitted into corresponding grooves in elements bounding on the pressure chamber. Depending on the design of the power transmission unit, in particular the arrangement of the individual elements with respect to each other and the design of the individual pressure chambers and their connections with each other, this creates a very complicated design with regard to the grooves provided for the individual sealing devices, these grooves being matched to the sealing devices that are to be used. Forming grooves on disk-shaped elements requires that they have a minimum thickness.

SUMMARY OF THE INVENTION

The object of the invention is therefore to further develop a power transmission unit of the type named at the beginning in such a manner that its position can be fixed by sealing devices, in particular by a plurality of sealing devices situated in various positions on an element, with the least possible expense and effort. Furthermore, the cost of engineering design and production technology with regard to the support surfaces for the sealing devices is to be kept as low as possible; that is, if possible no modifications of individual parts should be necessary with regard to specific types of sealing devices.

According to the invention, to fix the position of at least one sealing device, preferably of a plurality of sealing devices between a part and at least one attaching element to seal two pressure chambers in a power transmission unit from each other, a seal retainer device is provided which includes at least one contact surface for fixing the position of a single sealing device, and furthermore at least one first functional surface for attaching the seal retainer device to the part, in particular for position fixing and attachment. According to an especially advantageous embodiment at least one further second functional surface is provided, which assumes the function of a sliding bearing, in particular of an axial and/or radial sliding bearing.

With the solution according to the invention it is possible to situate sealing devices that have to be provided in a part anyway on the part, free of grooves that are otherwise necessary for support, whereby independence exists here with regard to the type of sealing device used and the parameters determined by the contact surfaces on the seal retainer device when dimensioning the individual sealing device on the particular part of the power transmission unit. If the second functional surface is preferably employed in an axial bearing arrangement, an additional axial bearing can be dispensed with, which in turn results in significant potential for savings. In particular, it is possible through the individual seal retainer device to fix a plurality of individual sealing devices in terms of their position with respect to the construction element and the connecting element, the type of the arrangement being determined essentially by the structural circumstances between the corresponding part and the connecting elements and by the geometry of the seal retainer device. Due to the concentration of functions, a relatively simple part can be provided as a multifunctional element at minimal expense, whereby at the same time other additional elements or measures for implementing these functions, for example a second axial bearing, can be dispensed with. Preferably the seal retainer device will be utilized on twistable, in particular rotatable elements, the seal retainer device being constructed in this case as a ring-shaped element. The design of its cross section can differ, depending on the position of the necessary contact surfaces and on the possibilities of attachment.

Preferably however, a design is chosen which, regarded in the installed position, is rotationally symmetrical with reference to a theoretical center axis which corresponds in the installed position to rotating elements of the axis of rotation. Designs that deviate from the symmetrical design are also conceivable however, in view of the local circumstances and the requirements of the arrangement, in particular the axial position fixing of the individual sealing devices. Since the seal retainer device must be adapted to the installation situation of the sealing devices with regard to the contact surfaces, the latter may be used to enable an axial and/or radial offset, so that arrangements of sealing devices are possible both in a single plane and in a plurality of planes that are offset from each other axially and/or radially.

The cross sectional form of the seal retainer device is based on the specific requirements of the individual case. When situated on rotationally symmetrical elements, it is also of rotationally symmetrical design. The zone of the cross section that forms the first functional surfaces can for example be U-shaped, C-shaped, L-shaped or even T-shaped, with preference being given to designs that enable a frictional or positive connection with the part, free of additional axial securing elements.

In a power transmission unit for connection between a drive engine and a transmission input shaft, with a hub connected to the transmission input shaft in a rotationally fixed connection which is involved together with two other connecting elements in forming two pressure chambers, there being sealing devices provided between the hub and the respective connecting element, the individual sealing devices are fixed between the hub and the connecting elements in the axial and/or radial direction by means of a seal retainer device in their position with regard to the hub and the connecting elements in the axial and/or radial direction, the seal retainer device being situated on the hub. The same benefits apply that were already named for the seal retainer device. Furthermore, it is possible to entirely dispense with grooves in the hub and the connecting elements, for example the piston or transmission input shaft, so that these do not need to be designed specifically with regard to a particular sealing situation, but this task is rather assumed by the seal retainer device.

The seal retainer device includes at least one first functional surface for coupling with the hub. The coupling is accomplished by frictional lock, preferably a compression connection acting in the circumferential direction, with no additional axial securing elements being necessary. A positive lock is also possible. The seal holder is designed to that end, according to an especially advantageous design, as a ring-shaped, cap-like element with a preferably C-shaped or U-shaped ring cross section to form at least two surface areas for contact with the hub, situated coaxially to each other and forming first functional surfaces, with projections oriented in the radial direction to form axial contact surfaces, and a connecting part between the coaxial surface areas.

If an axial bearing function is to be provided between the output or transmission input shaft or hub and the housing, that function can be assumed either by the hub itself or by the seal retainer device.

In the first case, a ring-shaped, cap-like element has a plurality of recesses in the area of the connecting piece in the circumferential direction, through which the projections that are oriented in the axial direction on the hub and form axial sliding bearing surface areas are guided, which work together with the inner circumference of the housing or surface areas provided thereon for that purpose. In this case, the axial sliding bearing surface on the hub side is made up of a plurality of individual partial surfaces. To that end, the hub is preferably designed as a sintered component.

According to the second option, the seal retainer device has at least one second functional surface oriented in the axial direction, which forms an axial or radial sliding bearing surface between the hub and a sub-area of the housing that forms an inner circumference. This second functional surface can also be formed by a plurality of partial surface areas. In the simplest case, with cap-like design, the end face which is already present anyway on the connecting piece is used. In order to prevent blocking of the pressure chamber in this case, channels, projections or recesses are provided either on the internal periphery of the housing, oriented in the axial direction to the hub, or on the end face of the hub directed toward the internal periphery of the housing in the axial direction, to realize a port for the flow of process fluid.

A C-shaped design is preferably chosen here for the cap-like element, viewed in cross section in the installed position. This is characterized in cross section by two legs, which are situated coaxial to each other when viewed in the radial direction and are coupled with each other through a connecting element. The coupling in this case forms the functional surface for realizing an axial bearing.

The individual functions, or the individual functional areas, can either be characterized by the choice of suitable material for the seal retainer device in terms of their property for the corresponding function through especially advantageous properties, or corresponding functional surface areas, for example, the stop faces or the functional surfaces for linking to a construction element and/or the functional surfaces for forming an axial bearing friction surface, have appropriate surface treatment or are coated. Depending on the possibility for use, inexpensive solutions can thus be realized through the specification of individual surface areas.

There are no restrictions with regard to the type of sealing device to be supported. O-rings, radial seal rings, rectangular rings etc. may be employed. Furthermore, the execution is also not limited to a particular number of sealing devices. The number depends on the circumstances, and is realized accordingly on the seal retainer.

Furthermore, a seal retainer device is used for sealing or position fixing of the sealing devices between an actuating mechanism for an engageable and disengageable clutch and a transmission input shaft and as an axial sliding bearing, with the sealing occurring in each case with respect to a hub element. This hub element may be the turbine hub, which is coupled to a turbine wheel in a rotationally fixed coupling, or for example as a hub element which is connected with the output of a device for damping vibrations.

The solution according to the invention makes it possible in this case to also assign the function of the axial bearing in particular to the seal retainer, in order to thus be able to dispense with additional components.

The solution according to the invention is employable in particular in power transmission units which have an engageable and disengageable clutch device, a hydrodynamic component and a device located down line from both in the power transmission path between input and output to damp vibrations, whose secondary part is connected to the hub in a rotationally fixed connection and which is constructed in triple-channel design.

BRIEF DESCRIPTION OF THE DRAWINGS

The solution according to the invention is explained below on the basis of figures. They depict the following details.

DETAILED DESCRIPTION OF THE INVENTION

Figure 1:
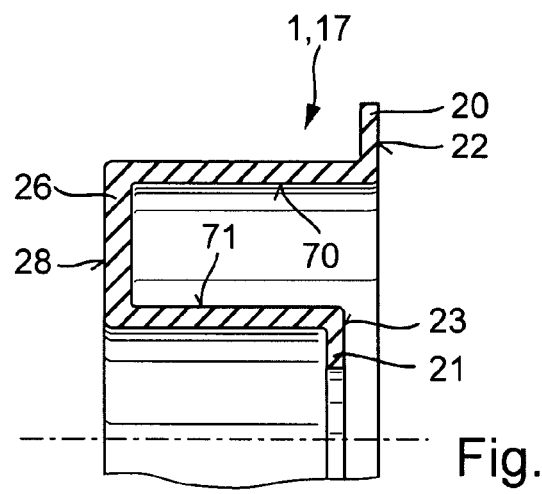
FIG. 1 illustrates the basic construction of a seal retainer device designed according to the invention, in a simplified schematic depiction.

FIG. 1 explains by way of example in an axial section one possible embodiment of seal retainer device 1 according to the invention for fixing the location of at least one, preferably of a plurality of sealing devices for delimiting two pressure chambers in a power transmission unit between two components. This can be of various design in terms of the geometric form, but includes at least one, in the depicted case two contact surfaces 22, 23 formed on flange-type projections 20 and 21 oriented in a radial direction, for fixing the position of one sealing device each in radial and/or axial direction, at least one first functional surface, here in exemplary fashion first inner and outer functional surfaces 71, 70 for linking or attachment to a component, and preferably in addition second functional surface 28, for example for forming an axial or radial bearing sliding surface. In the depicted case the seal retainer device 1 is designed as ring-shaped cap-like element 17 with C-shaped cross section, which can be pressed for example onto a ring-shaped axial projection running in the circumferential direction on a component and supports two sealing devices in axial direction with contact surfaces 22 and 23. First function surfaces 70 and 71 are formed here by surface areas that run in the circumferential direction, second functional surface 28 by a surface oriented in axial direction. The classification of individual functional surfaces 70, 71 and 28 here is exemplary. Depending on the arrangement of the sealing devices with respect to the component and of the sealing devices and contact surfaces, a plurality of designs for these on the component are conceivable; seal retainer device 1 has a constant support structure, however.

Figure 2:
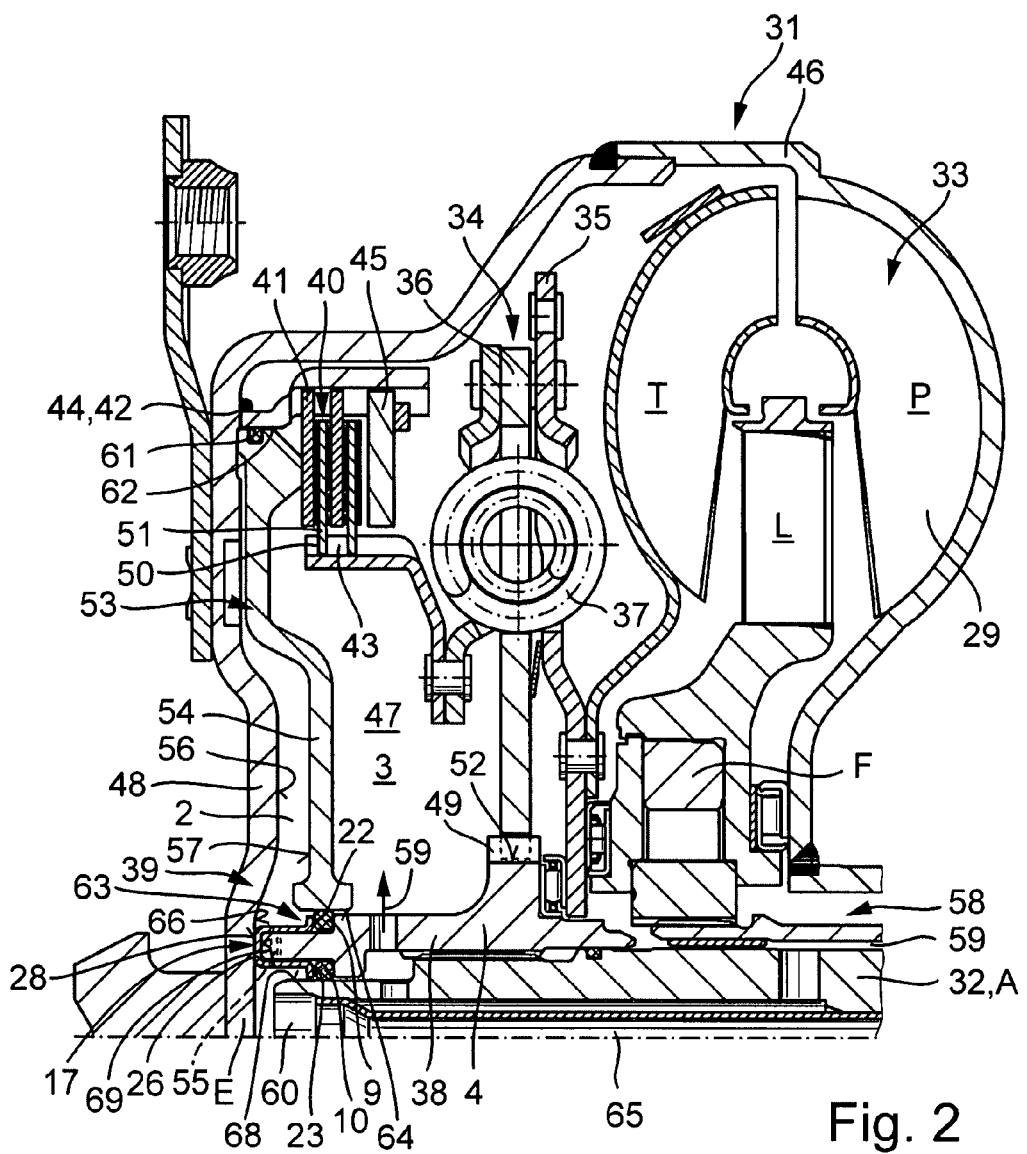
FIG. 2 illustrates a power transmission unit designed according to the invention, having a seal retainer device designed according to the invention, on the basis of an axial section.

FIG. 2 explains in an axial section power transmission unit 31 with seal retainer device 1 designed according to the invention to seal two pressure chambers from each other, here two pressure chambers 2 and 3 situated side-by-side in the axial direction. At the same time, FIG. 3 explains on the basis of a detail view of the installation situation according to FIG. 2 a first advantageous embodiment of seal retainer device 1 according to the invention, with its structure being described once again in conjunction with the connecting elements. Seal retainer device 1 serves to seal two pressure chambers 2, 3 on a component 4 with boundary surfaces 5 and 6 for pressure chambers 2 and 3 for sealing from connecting elements 7 and 8. In the depicted case, component 4 and two connecting elements 7 and 8 are arranged coaxially in reference to each other. Seal retainer device 1 serves to fix the position of individual sealing devices 9 and 10, first sealing device 9 being situated between component 4 and first connecting element 7 and second sealing device 10 being situated between component 4 and second connecting element 8. Because of the coaxial arrangement, combined axial and radial seals are combined here. The fixing on component 4 takes place at stop 11 or 12 executed in the axial direction, which is formed by corresponding ring-shaped surfaces areas 13 and 14 that run in the circumferential direction and are formed in the axial direction. Component 4 has at least two sections for that purpose in the axial direction, first section 15 being designated as the sealing section, on which sealing devices 9 and 10 are situated. This first section is formed here with a smaller outside diameter than the second adjacent section 16, while the inside diameter in first section 15 is executed larger than in second section 16. That causes first section 15 to be executed quasi as a ring-shaped axial projection running in the circumferential direction, on which individual sealing devices 9 and 10 are run. Due to the position relative to each other, first sealing device 9 is designed as the outer sealing device in the radial direction between component 4 and connecting element 7, while the second sealing device as radially inner sealing device 10 is situated between component 4 and connecting element 8. To fix the two sealing devices 9 and 10 axially, seal retainer device 1 is provided. The latter is designed as cap-like element 17, which encloses the projection formed by first section 15 in the axial direction and the circumferential direction and has at end areas 18 and 19, which point to sealing devices 9 and 10 in the installed position, flange-like projections 20 and 21 which extend in the radial direction and form contact surfaces 22 and 23 oriented in the axial direction for the individual sealing devices 9 and 10. In the depicted case, first and second sealing devices 9 and 10 are situated by way of example in one plane in the axial direction, and offset from each other in the radial direction. Cap-like element 17 must be designed accordingly with regard to its geometry. In this case the cross section of the ring-shaped area of the cap-like element that encloses the projection is symmetrical in reference to a cross section central axis MQ, which would be situated parallel to the axis of rotation R, viewed here in the installed position. Cap-shaped element 17 is describable by a C-shaped cross section rotating around a center axis, which in the installed position corresponds to the axis of rotation R. Two legs 24 and 25 describing the C-shape in the cross section, which are formed by flat ring wheels, have flange-like projections 20 and 21 at end areas 18 and 19, which are oriented here at a right angle to sides 24 and 25 and run in the circumferential direction. The lengths of the legs are designed here with regard to the axial arrangement of individual sealing devices 9 and 10. If these are situated at an offset to each other in the axial direction, this is manifested in different lengths of legs 24 and 25. Leg 24 with its surface describing an inner circumference forms first functional surface 70, leg 25 with its surface describing an outer circumference, forms an additional functional surface 71. Connecting area 26 between two legs 24, 25, which are oriented in the radial direction and likewise run in the circumferential direction, can be used with its surface facing away from contact surfaces 22, 23 and sealing devices 9, 10, in particular face 27, as second functional surface 28. Depending on the application, this can be a bearing surface, in particular an axial bearing surface, a running surface or a supporting surface. Seal holding device 1 thus includes contact surfaces 22, 23 functioning as seal holding surfaces, functional surfaces 70 and 71 for bracing with the ring-shaped projection, and functional surface 28, these surfaces being arranged in relation to each other with regard to the structural circumstances. Accordingly, seal retainer device 1 is also free in terms of its geometry. However, the seal holding or contact surfaces and at least one functional surface are always arranged in such a way that that can take over the corresponding tasks. The geometry of the seal retainer, regarded in cross section, is designed accordingly.

Seal retainer device 1 can be connected to component 4 in any way desired. Frictional or positive lock designs are chosen by preference. In the case of a frictional lock seal retainer device 1 is connected to component 4 for example by means of a compression connection, the frictional lock connection being executed free of additional securing elements, in particular in the axial direction. A compression connection is formed here for example depending on the clearances between the outer diameter of component 4 in section 15 and the diameter of outer functional surface 70 of cap-like element 17 in the area of leg 24, as well as the inner diameter of component 4 in section 15 and the diameter at inner functional surface 71. Other designs consist in the realization of a positive lock, for example in the nature of a bayonet connection.

Power transmission unit 31 shown in FIG. 2 is designed as a three-channel unit. It includes input E and output A. Output A is formed here, for example, by transmission input shaft 32 coupled with a gear set situated down-line from the power transmission unit.

Situated between input E and output A is hydrodynamic component 33, comprising at least one impeller which, when regarded in the direction of the power transmission path during transmission of power between input E and output A, functions as pump wheel P, and a second impeller which functions as turbine wheel T, which form working chamber 29 that may be filled or is filled with process fluid. Pump wheel P here is at least indirectly connected in a rotationally fixed connection to input E, while turbine wheel T is at least indirectly connected to output A, in particular transmission input shaft 32. In the case depicted the coupling is indirect, i.e., not direct but through apparatus 34 for damping vibrations. Apparatus 34 for damping vibrations can be executed in various ways. It normally includes an input part in the power transmission path between input E and output A, designated as primary part 35, and an output part designated as secondary part 36, which are situated coaxial to each other and can be rotated to a limited extent relative to each other in the circumferential direction, and are coupled with each other through means of spring coupling or damping coupling. Secondary part 36 is connected here to transmission input shaft 32 through hub 38. The coupling between hub 38 and transmission input shaft 32 is rotationally fixed, and can be designed to be movable in the axial direction. Hub 38 is supported in the axial direction on housing 39. Hub 38 corresponds to component 4. In addition, power transmission unit 31 includes engageable and disengageable clutch device 40. This functions as a device for circumventing the transmission of power through hydraulic component 33, in particular as a lockup clutch. Engageable and disengageable clutch 40 is designed here as a frictionally locking clutch, and is preferably executed in shaft and disk construction. By preference, engageable and disengageable clutch 40 is designed in lamellar construction. In that case first clutch part 42 is formed by outer plate carrier 44 with outer plates 41 attached to it or guided in the axial direction and stop 45 provided on them in the axial direction, which is formed for example by an axially secured end plate. First clutch part 42 here is connected in a rotationally fixed connection to pump wheel P or input E. The coupling is accomplished here with cover 48, which together with pump wheel shell 46 encloses turbine wheel T and engageable and disengageable clutch 40, forming a space that corresponds to pressure chamber 3. This is co-rotating housing 39, which is formed of cover 48 and pump wheel shell 46. In addition, cover 48 itself can be driven directly, or is connected in a rotationally fixed connection to an element which is coupled with a drive engine. In the first case cover 48 forms input E. Second clutch part 43 is connected at least indirectly in a rotationally fixed connection to output A, in particular to transmission input shaft 32. The coupling is accomplished here through apparatus 34 for damping vibrations.

To that end, second clutch part 43, which, in the depicted case here, by way of example, includes inner plate carrier 50 and inner plates 51 that are movably attached to it in the axial direction, is connected in a rotationally fixed connection to primary part 35 of device 34 for damping vibrations. Secondary part 36 of device 34 for damping vibrations is guided in a rotationally fixed manner, but with the possibility in the axial direction of a relative motion between hub 38 and secondary part 36. Preferably the guidance takes place on area 52 of hub 38 that forms an outer circumference. In the simplest case, the connection can take place through splined shaft connection 49 or through gearing.

In addition, actuating mechanism 53 is provided which connects two clutch parts 42 and 43 of engageable and disengageable clutch 40 at least indirectly in an operative connection. Two clutch parts 42 and 43 include plates, at least one clutch part each having plates with frictional surfaces that can be brought into operative connection with the elements of the other clutch part, preferably in the form of steel disks. Engageable and disengageable clutch 40 is freely operable, independent of the other pressure conditions; that is, it is actuated with a desired adjusting pressure by pressurizing a pressure chamber. Actuating mechanism 53 includes piston element 54 and a chamber assigned to it which may be pressurized by a pressure medium, which corresponds to pressure chamber 2. The latter is formed between inner circumference 56 of housing 39, in particular of cover 48, and front side 57 of piston element 54 facing away from the hydrodynamic component, which is designed as a ring-disk-shaped element. In the case depicted, piston element 54 is guided so that it is movable in the axial direction on housing 49, in particular first clutch part 42 which is coupled with it in a rotationally fixed connection, and furthermore on hub 38, with the guiding being performed so that it is pressure-tight and fluid-tight, while forming the chamber that is pressurizable with pressure medium, in particular pressure chamber 2. The latter is sealed off by means of corresponding sealing devices 9 and 10 from interior space 47, which corresponds to pressure chamber 3. As stated earlier, this is a three-channel design, which means that at least three chambers or spaces that may be filled with pressure medium or process fluid are provided here. A first space that may be filled with pressure medium or process fluid is formed by working space 29, a second space that may be filled with pressure medium or process fluid is formed by inner space 47, and the third pressure chamber by pressure chamber 2. At least one connection is assigned to each of these spaces, the term connection being understood functionally, in that an in-feeding or removal of process fluid takes place through it. These are designated here as 58, 59 and 60. First connection 58 is connected to the first pressure chamber, second connection 59 to the second pressure chamber, and third connection 60 to the third pressure chamber, which acts on piston element 54. The third pressure chamber, which corresponds to pressure chamber 2, is sealed off from second pressure chamber 3.

The sealing is accomplished on the one hand by sealing unit 61 which is situated between a sub-section of the piston element that forms outer circumference 62 and housing 39 or first clutch part 42 which is connected to the latter in a rotationally fixed connection, and second sealing unit 63 which provides a seal in the area of inner circumference 64 of piston element 54.

Second sealing unit 63, which includes sealing devices 9 and 10, is held here according to the invention by seal retainer device 1. The fixing of first sealing device 9 takes place between inner circumference 64 of piston element 54 and a surface area on hub 38 that forms outer circumference 66. Second sealing device 10 is situated between outer circumference 68 of transmission input shaft 32 and a sub-section on hub 38 that forms inner circumference 69. Hence two radial sealing rings are provided, which are situated in one plane in the radial direction in the depicted case. In the depicted case with this design the arrangement preferably occurs in a plane which is determined by the axis of rotation R and a perpendicular thereto. Due to the arrangement in a plane, seal retainer device 1 is executed in a plane that is symmetrical with reference to an axis which is parallel to axis of rotation R. Viewed in cross section, the latter has a C-shaped cross section with projections provided in the radial direction at the open end area, which form contact surface 22, 23 or holding surfaces for the sealing devices. Furthermore, connecting part 26 forms functional surface 28 between the legs, namely with its surface facing cover 48. This functional surface 28 preferably rests directly against inner circumference 56 of cover 48. In the installed position, functional surface 28 of the seal retainer thus acts as an axial bearing, and thus realizes a corresponding pair of sliding bearings between cover 48 and cap-like element 17. At the same time, when hub 38 rests against inner circumference 56, pressure chamber 2 would be uncoupled from the connection, which is formed here by supply channel 65 that is routed through transmission input shaft 32. However, in order for it to be possible to supply process fluid or controlling or pressure medium, ports 55 are provided in hub 38 for example according to FIG. 2, which run in the radial direction when viewed in the installed position. These preferably extend perpendicular to axis of rotation R in the radial direction through hub 38, and furthermore through seal retainer device 1, it being necessary then for the ports in hub 38 and in seal retainer device 1 to overlap, and the overlap zone must also allow for a possible axial movability.

Various possibilities are conceivable for designing seal retainer device 1 to realize the supply of pressure medium to pressure chamber 2, which are describable by projections or recesses.

Figure 3:
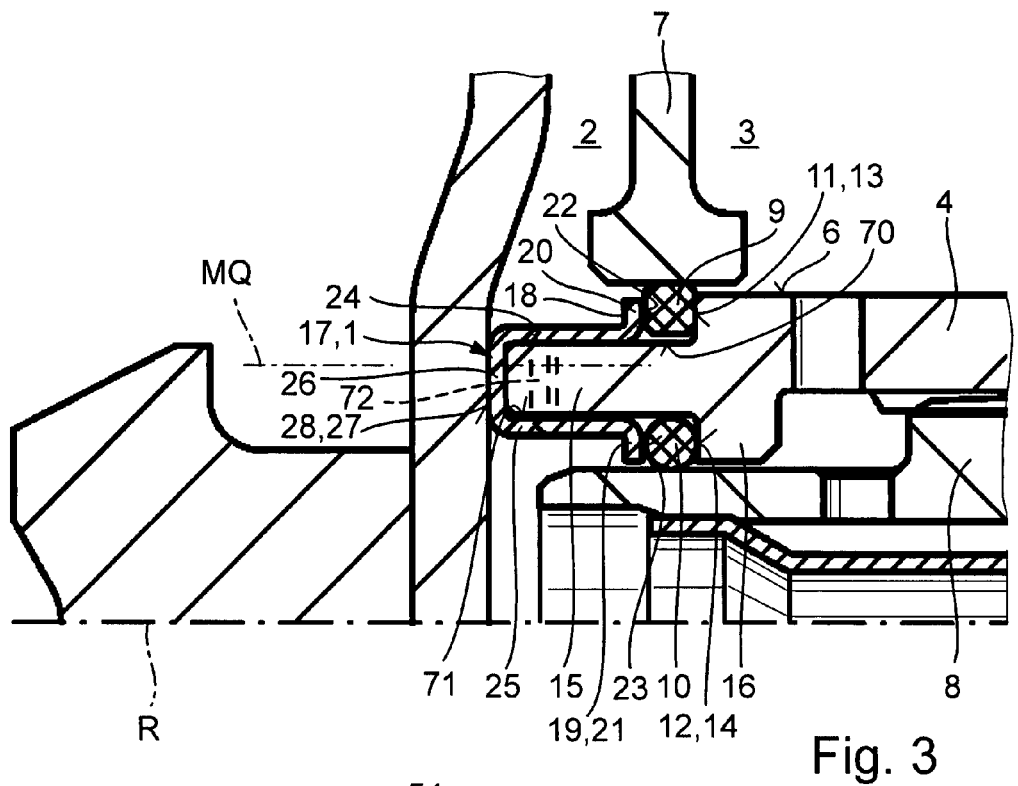
FIG. 3 illustrates a first embodiment of a seal retainer device according to an installation situation according to FIG. 2.

According to another embodiment in FIG. 3, channels 72 may be provided on hub 38 which run in the radial direction and enable process fluids to pass from supply channel 65 into pressure chamber 2. Channels 72 are situated on the face of hub 38 facing toward housing 39.

Figure 4:
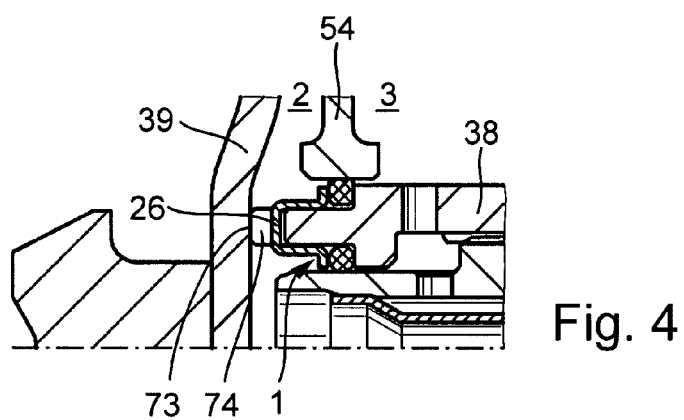
FIG. 4 illustrates a further possible embodiment of a seal retainer device for use in a design according to FIG. 2; and, FIG. 5 illustrates a further possible embodiment of a seal retainer device for use in a design according to FIG. 2.

Another embodiment according to FIG. 4 consists for example in providing recesses 73 in connecting area 26, formed in the axial direction on seal retainer device 1, through which projections 74 on hub 38 that protrude in the axial direction are guided, connecting area 26 resting against the surface areas on the face of hub 38 that are free of the projections. In this embodiment, the axial bearing or thrust plate function is transferred to hub 38, in particular formed by hub 38 with its surface areas on projections 74, which come into operative contact with inner circumference 56 of cover 48. In this case hub 38 is preferably executed as a sintered part. Preferably a plurality of projections 74 and recesses 73 are provided on hub 38 or seal retainer 1, situated at uniform intervals from each other.

Figure 5:
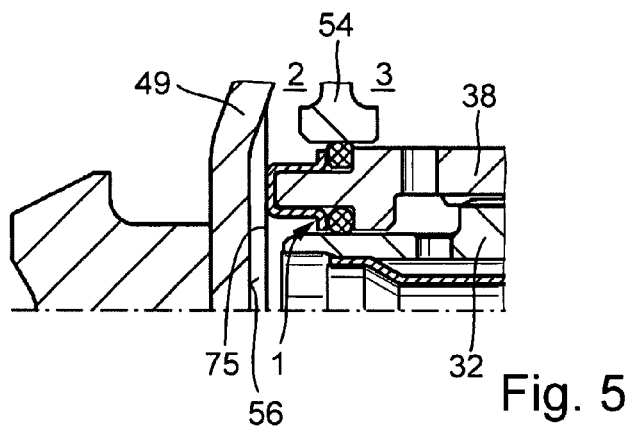

FIG. 5 explains a design of hub 38 and of seal retainer device 1 as described in FIGS. 2 and 3, although free of channels and ports, with pressure chamber 2 being coupled to supply line 65 via recesses on housing 39, in particular in the area of the inner circumference 56. The recesses are formed by protrusions 75 that are situated in the circumferential direction and spaced apart from each other, which run in the radial direction in the installed position and produce interstices. The surface areas of protrusions 75 that face the hub form a contact or support surface for hub 38.

Supplying of the process fluids can thus be ensured either by recesses on the cover, recesses on the hub or an appropriate design of the functional surface, forming a port in the installed position when placed against the cover element.

The seal retainer is preferably attached here by frictional means. Other possibilities are conceivable, in particular positive-lock connections. Through the choice of materials, for example bronze or aluminum, the functional surface can be used directly as an axial bearing in order to support axial forces of turbine wheel T, in particular of hub 38. It is also conceivable to merely provide the functional surface with a surface coating or to treat the surface correspondingly, in order to also assume the function of the axial bearing here.

The solution according to the invention can be used on the one hand to realize sealing functions to seal off different pressure chambers for components that move freely relative to each other, i.e., without a relative speed of rotation, as well as for embodiments with a necessary sealing function with a relative speed of rotation at a lower speed or also a higher sliding velocity. The deciding factor is that the seal retainer device has different surface areas that serve different functions; at least a seal retainer or holding function should be named here, and furthermore a functional surface that can be used as desired, for example as a sliding surface in a slide bearing.

In addition, the solution according to the invention serves to fix a plurality of sealing functions at least in the axial direction, and preferably also in the radial direction, depending on the design. Sealing devices may also be involved between components that move relative to each other or stationary components.

There are no restrictions with regard to the designs of the sealing device. The sealing devices can be of the same nature and type, or may be different types of varying natures in their position relative to each other, with a corresponding adaptation being performed only with regard to the seal retainer device. Since the seal retainer device normally consists of a sheet metal part, it can be produced by simple shaping.

REFERENCE NUMBERS 1 seal retainer device
2 pressure chamber
3 pressure chamber
4 component
5 boundary surface
6 boundary surface
7 connecting element
8 connecting element
9 sealing device
10 sealing device
11 stop
12 stop
13 surface area
14 surface area
15 first section
16 second section
17 cap-like element
18 end area
19 end area
20 flange-like projection
21 flange-like projection
22 contact surface
23 contact surface
24 leg
25 leg
26 contact area
27 end face
28 functional surface
29 seal holding surface
30 seal holding surface
31 power transmission unit
32 transmission input shaft
33 hydrodynamic component
34 device for damping vibrations
35 primary part
36 secondary part
37 means of spring and/or damping coupling
38 hub
39 housing
40 engageable and disengageable clutch
41 outer plates
42 first clutch part
43 second clutch part
44 outside plate carrier
45 stop
46 primary wheel shell
47 interspace
48 cover
49 splined shaft connection
50 inner plate carrier
51 inner plate
52 area
53 actuating mechanism
54 piston element 55 port
56 inner circumference
57 face
58 connection
59 connection
60 connection
61 sealing unit
62 sub-area forming outer circumference
63 second sealing unit
64 inner circumference
65 supply channel
66 sub-area forming outer surface
67 sub-area forming outer surface
68 outer circumference
69 sub-area forming inner circumference
70 functional surface
71 functional surface
72 channel
73 recess
74 projection
75 protrusion
E input
A output
P pump wheel
T turbine wheel
L guide wheel

What is claimed is:

1. A power transmission unit (31) for connecting between a drive engine and a transmission input shaft (32), including:
 a turbine;
 a piston for a torque converter and the input shaft for a transmission forming at least respective portions of two pressure chambers (2, 3);
 a hub (38) at least partially rotatable with respect to the turbine and arranged to engage the input shaft such that the hub and the input shaft rotate in unison;
 a first sealing device in contact with the hub (38) and the piston; and,
 a second sealing device in contact with the hub (38) and the input shaft, wherein:
  the first and second sealing devices are fixed with respect to the hub (38) in an axial direction by means of a seal retainer device (1); and
  the seal retainer device (1) is situated on the hub (38) such that the seal retainer device surrounds an end of the hub in axial and radial directions.

2. The power transmission unit (31) recited in claim 1, wherein the seal retainer device (1) includes at least one first functional surface (70, 71) for coupling with the hub (38).

3. The power transmission unit (31) recited in claim 2, wherein the coupling of the first functional surface (70, 71) with the hub (38) is accomplished by a compression connection.

4. The power transmission unit (31) recited in claim 2, wherein the coupling of the first functional surface (70, 71) with the hub (38) is accomplished by positive locking.

5. The power transmission unit (31) recited in claim 1, wherein the seal retainer device (1) is designed as a ring-shaped, cap-like element (17) with a C-shaped or U-shaped ring cross section to form at least two surface areas for contact with the hub, situated coaxially to each other and forming first functional areas (70, 71) that form first functional surfaces, with projections (20, 21) oriented in the radial direction to form axial contact surfaces (22, 23), and a connecting part (26) between the coaxial surface areas (70, 71).

6. The power transmission unit (31) recited in claim 5, wherein the cap-like element (17) has a plurality of recesses (73) in the area of the connecting part (26) in the circumferential direction, by which the projections (74) that are oriented in the axial direction on the hub (38) and form axial sliding bearing surface areas are guided.

7. The power transmission unit (31) recited in claim 6, wherein the hub (38) is executed as a sintered component.

8. The power transmission unit (31) recited in claim 1, wherein the seal retainer device (1) has at least one second functional surface (28) oriented in the axial direction, which forms an axial or radial sliding bearing surface between the hub (38) and a sub-area of a housing (39) that forms an inner circumference.

9. The power transmission unit (31) recited in claim 8, wherein the second functional surface (28) is formed by a plurality of partial surface areas.

10. The power transmission unit (31) recited in claim 8, wherein the second functional surface (28) oriented in the axial direction is formed on a connecting part (26).

11. The power transmission unit (31) recited in claim 8, wherein channels, projections or recesses are provided on the inner circumference of the housing (39) in the axial direction with respect to the hub (38) to realize a port for the flow of process fluid.

12. The power transmission unit (31) recited in claim 11, wherein said power transmission unit is designed as a three-channel unit, and the seal retainer device (1) is employed to seal off a pressure chamber (2) that is pressurizable with medium pressure to pressurize the control device of the engageable and disengageable clutch device (40) from an interspace (47) enclosed by the housing (39).

13. The power transmission unit (31) recited in claim 8, wherein channels, projections or recesses (72) are provided on the face of the hub (38) oriented in the axial direction with respect to the inner circumference of the housing (39) to realize a port for the flow of process fluid.

14. The power transmission unit (31) recited in claim 1, wherein said power transmission unit has an engageable and disengageable clutch device (40), a hydrodynamic component (33) and an apparatus for damping vibrations situated down line from both in the power transmission path between an input (E) and an output (A), and wherein a secondary part (36) for the output is connected to the hub (38) in a rotationally fixed connection.

15. A torque converter, comprising:
 a torque converter clutch with a piston;
 a first chamber partially formed by the piston, wherein pressure in the first chamber is arranged to displace the piston to close the torque converter clutch;
 a second chamber partially formed by the piston, wherein pressure in the second chamber is arranged to displace the piston to open the torque converter clutch;
 a hub arranged to rotationally engage a transmission input shaft and including:
  a first opening through which an axis of rotation for the torque converter passes; and,
  a connection passageway, wholly surrounded by the hub, and including:
   a second opening connecting the connection passageway to the second chamber and facing radially outward; and,
   a third opening connecting the connection passageway to the first opening and facing radially inward; and,
 a seal retainer device including a first seal in contact with the piston and the hub and a second seal in contact with the hub and arranged to contact the transmission input shaft, wherein:

the seal retainer device includes a ring-shaped element fixed to a distal end of the hub; and, respective distal ends of the ring-shaped element are in contact with the first and second seals, respectively, to axially fix the first and second seals against the hub.

16. The torque converter of claim 15, wherein:

the piston includes a first radially inwardly facing surface in contact with the first seal;

the hub includes a first radially outward surface in contact with the first seal and a second radially inwardly facing surface in contact with the second seal; and, the second seal is arranged to engage a second radially outwardly facing surface of the input shaft.

17. The torque converter of claim 16, wherein the piston is arranged to axially displace such that the first radially inwardly facing surface displaces along the first seal.

18. The torque converter of claim 15, wherein:

the hub includes first and second axially facing surfaces;

the first and second seals are in contact with the first and second axially facing surfaces, respectively; and, the first and second seals are axially fixed with respect to the hub.

\* \* \* \* \*